Oct. 30, 1962 W. B. McCALL 3,060,910
ROTARY INTERNAL COMBUSTION ENGINE
Filed Nov. 21, 1960 5 Sheets-Sheet 1

INVENTOR.
WILLIAM B. McCALL.
BY
Willard S. Gwinn
ATTORNEY.

Oct. 30, 1962 W. B. McCALL 3,060,910
ROTARY INTERNAL COMBUSTION ENGINE
Filed Nov. 21, 1960 5 Sheets-Sheet 2

INVENTOR.
WILLIAM B. McCALL.
BY
*Willard S. Grown*
ATTORNEY.

Oct. 30, 1962          W. B. McCALL          3,060,910

ROTARY INTERNAL COMBUSTION ENGINE

Filed Nov. 21, 1960          5 Sheets-Sheet 3

INVENTOR.
WILLIAM B. McCALL.
BY
ATTORNEY.

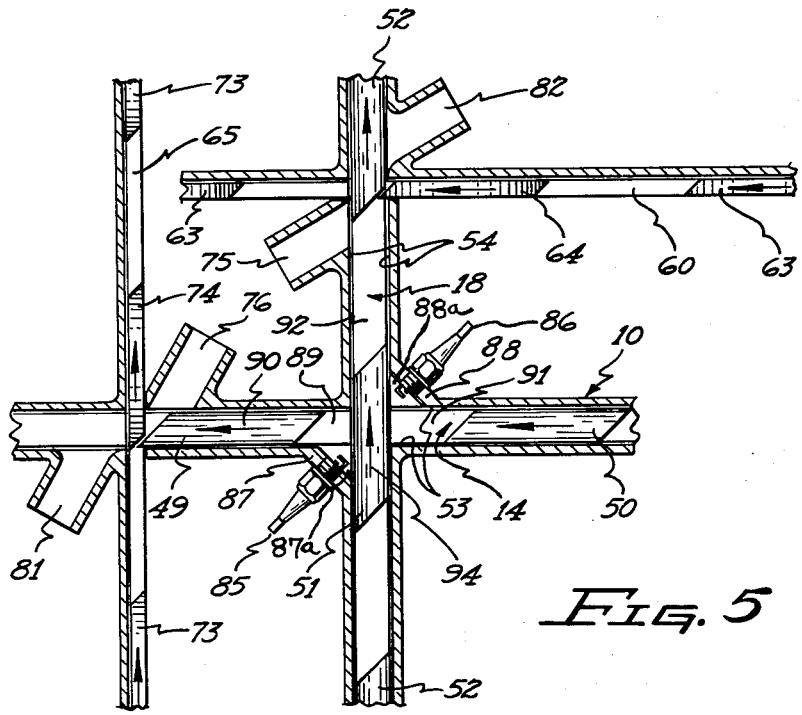
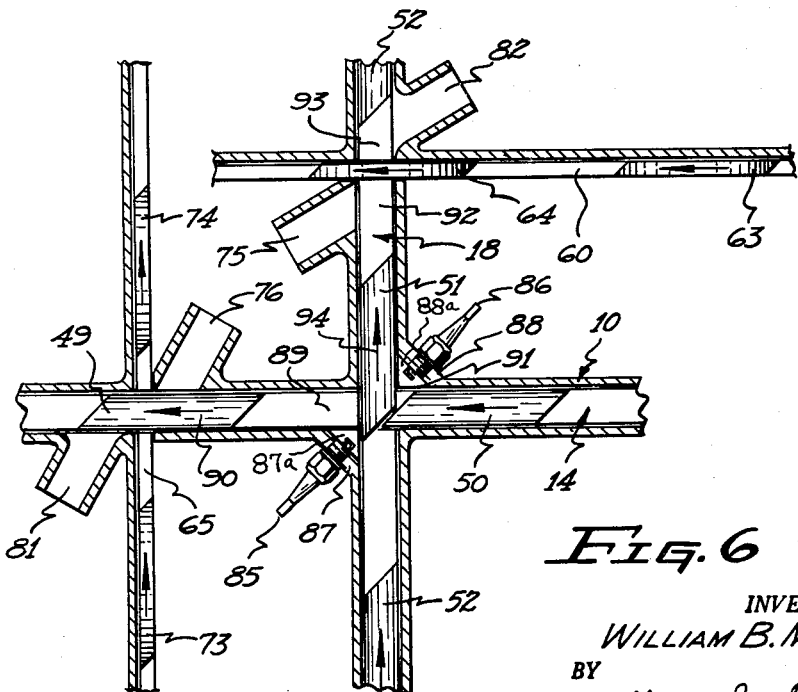

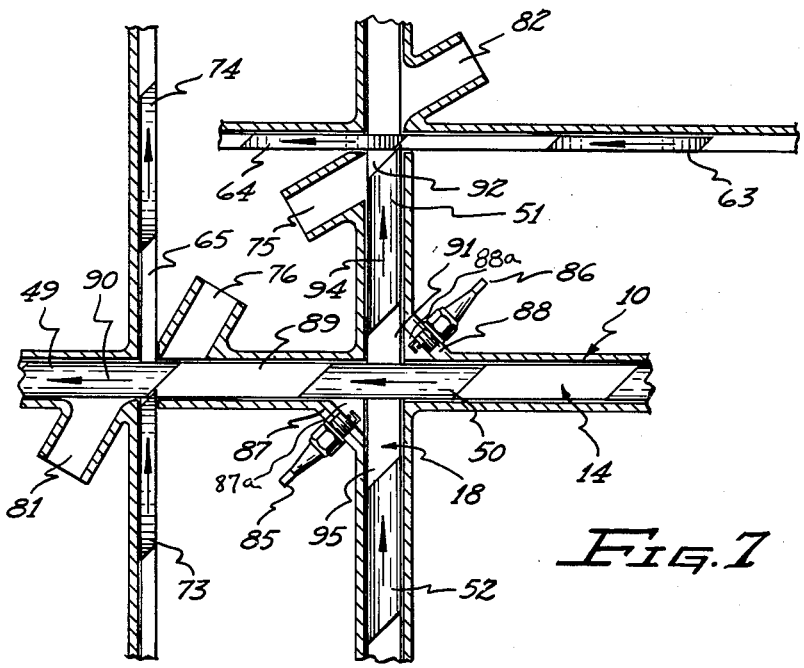
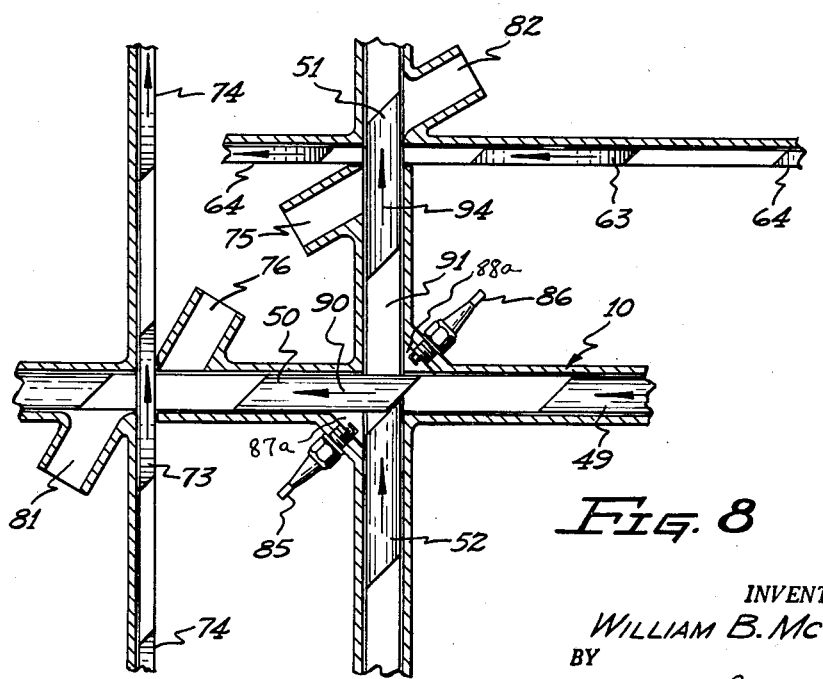

United States Patent Office 3,060,910
Patented Oct. 30, 1962

3,060,910
ROTARY INTERNAL COMBUSTION ENGINE
William B. McCall, 1527 E. Oak St., Apt. 20,
Phoenix, Ariz.
Filed Nov. 21, 1960, Ser. No. 70,634
7 Claims. (Cl. 123—12)

This invention relates to internal combustion engines and more particularly to an engine of the rotary type in which abutments adapted to serve as pistons as well as cylinder heads are mounted on a rotor for operation in a circular passage that is formed by the rotor together with a surrounding stationary casing or stator.

This invention is related to improvements in apparatus such as shown in my Patent 2,674,982 issued April 13, 1954.

One of the objects of this invention is to provide a rotary internal combustion engine of simple construction and relatively few moving parts that operates in a balanced, efficient manner free of vibration and without the usual consumption of energy by continually repeated acceleration and deceleration of reciprocating parts.

Another object of this invention is to provide a rotary internal combustion engine which in simple form comprises essentially two synchronized rotors, each having one or more peripheral pistons in which each rotor is also synchronized with one notched rotating abutment which, as it rotates, alternately opens and then closes the piston passageway at approximate end of each power stroke. The action of this rotating abutment alternately opens the circular piston passageway which allows piston to pass through, then blocks piston passageway to effect a positive displacement of exhaust gases at the end of the power stroke and by having displaced the exhaust gases leaves the space behind the piston in a partial vacuum to receive the incoming fuel mixture which will be compressed for a power stroke in the passageway of the piston on the other rotor.

Another object of this invention is to provide a rotary engine as above recited having rotors and abutments enclosed in a housing in which the rotors are spaced apart and in a simple engine, for example, are at 90 degrees to each other, the pistons of each rotor rotating continuously in one direction in their own respective passageways in the housing, the piston passageways having a common intersection space which is continuously occupied either by a piston of one rotor or by a piston of the other rotor or by parts of pistons of each rotor. The compressed fuel mixture is stored in the combustion chambers which are in communication with both piston passageways and which are located adjacent to the common intersection space.

One of the basic objects of this invention is to provide a rotary internal combustion engine in which each piston, of each rotor, during each revolution, intakes and compresses a gas for a power and exhaust stroke in passageway of a piston on the other rotor.

And a further object is to provide a rotary internal combustion engine which operates cooler and more efficiently with less weight per horsepower being required.

It is also an important object to construct a rotary internal combustion engine which provides double the power stroke displacement of engines such as described in Patent No. 2,674,982.

And it is an object of this invention to provide a rotary internal combustion engine in which less compression load is imposed on the rotor synchronizing gears due to the fact that power and compression strokes are being effected by pistons on the same rotor at the same interval of time.

Further features and advantages of this invention will appear from a detailed description of the drawings in which:

FIG. 5 is a diagrammatic section showing the relative position of rotor pistons and abutment blades at the beginning of a power movement of one of the rotors of the engine.

FIG. 6 is a diagrammatic section similar to FIG. 5 showing the parts at an intermediate stage of the power movement of one of the rotors.

FIG. 7 is a diagrammatic section similar to FIGS. 4 and 5 showing the parts at the time of exhaust position of one of the rotors.

FIG. 8 is a diagrammatic section similar to FIGS. 5, 6 and 7 showing the parts at the intake position of one of said rotors.

Figures 1, 2:
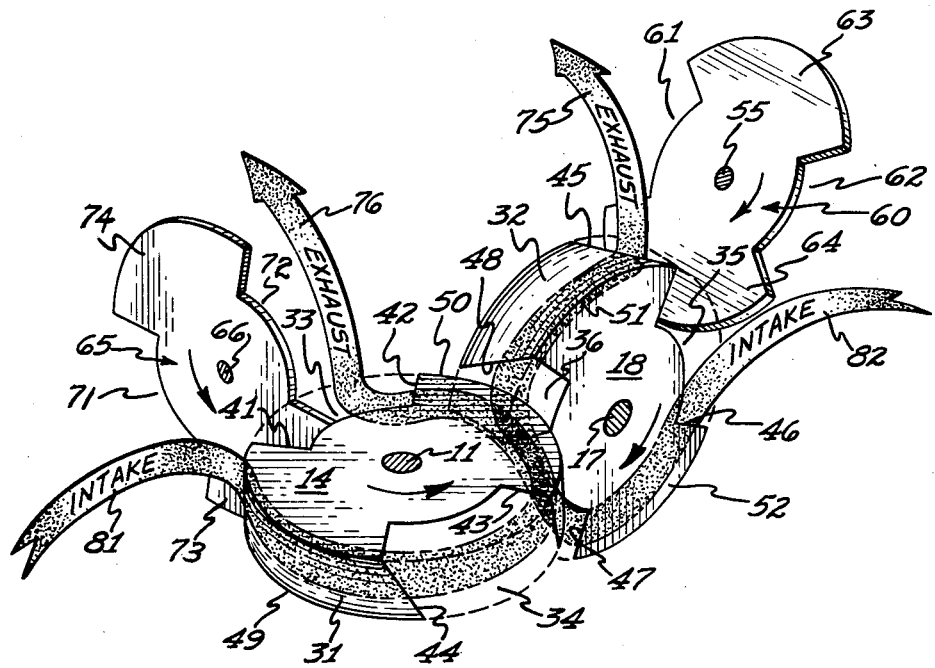
FIG. 1 is a diagram showing the basic elements and mode of operation of the device in one position of the rotary cycle of the engine.
FIG. 2 is a diagram similar to FIG. 1 showing another stage in the operation of the engine.

As an example of one embodiment of this invention, there is shown a rotary internal combustion engine comprising a housing 10 in which is journaled a first rotor shaft 11 carried on suitable anti-friction bearings 12. A first rotor 14 has hub portions 15 suitably journaled on bearings 13 in the housing 10, the first rotor shaft passing through a bore 16 in the rotor 14, the rotor 14 being rigidly secured in driving relationship on said shaft. A second rotor shaft 17 is journaled in suitable anti-friction bearings 17a in the housing 10. A second rotor 18 has hub portions 19 carried in suitable anti-friction bearings 20 in the housing 10, the second rotor shaft 17 passing through a bore 21 in the second rotor and being rigidly secured in driving relationship to said rotor.

The rotor shafts 11 and 17 and their respective rotors 14 and 18 are caused to rotate in desired timed relationship by means of the timing gear train comprising a gear 22 suitably fixed on the first shaft 11 which is in mesh with a gear 23 suitably fixed to the bevel pinion shaft 24 journaled on the anti-friction bearings 25 and 26 carried in the housing 10. A bevel pinion 27 is formed integral or suitably fixed with the shaft 24 and is in mesh with the bevel pinion 28 suitably fixed on the second rotor shaft 17 to thus complete the timing drive between the shafts 11 and 17. Power output or input to the unit may be obtained from the outward extension 29 of the rotor shaft 11 or the outward extension 30 of the rotor shaft 17.

Each of the rotors 14 and 18 have the respective concave peripheral surfaces 31 and 32. Cut-out portions 33 and 34 are formed in the rotor 14 and cut-out portions 35 and 36 are formed in the rotor 18. As described, the rotor 14 revolves in the housing 10 about an axis 37 while rotor 18 revolves about an axis 38 which is radially spaced from axis 37 and at right angles thereto. The timing gears described above are so arranged and the shafts 11 and 17 are so positioned in the housing that the peripheries 31 and 32 of the rotors overlap and the cut-out portions 33—34 and 35—36 are so arranged that the cut-out portion of one rotor always receives the peripheral portion of the other as the two rotors rotate in timed relationship so that the peripheral portion 31 of rotor 14 rotate in close proximity with the root surface 39 of rotor 18 while the peripheral surface 32 of the rotor 18 is adapted to rotate in close proximity with the root surface 40 of the rotor 14. Bevelled surfaces 41 and 42 defining cut-out portion 33 and bevelled surfaces 43 and 44 defining cut-out portion 34 are formed on rotor 14 while bevelled surfaces 45 and 46 defining cut-out portion 35 and bevelled surfaces 47 and 48 defining cut-out portion 36 on rotor 18 provide smooth entrance and departure of the various peripheral portions between the rotors. The peripheral portions 49 and 50 of rotor 14 and the peripheral portions 51 and 52 of rotor 18 operate respectively in the close fitting bores 53 and 54 and function as pistons while the cut-out portions 33, 34, 35 and 36 function as cylinders.

Figure 3:
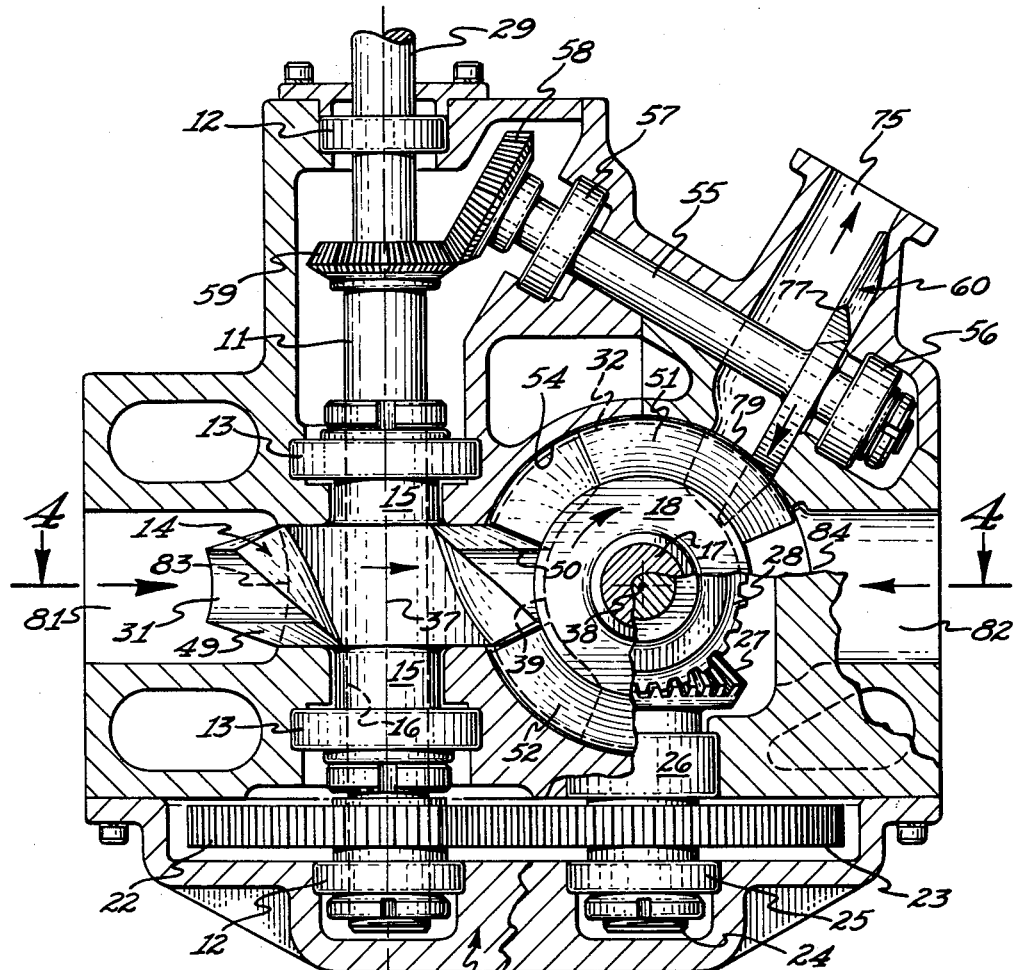
FIG. 3 is an enlarged section of a rotary internal combustion engine incorporating the features of this invention particularly showing the rotors and rotor shafts on the line 3—3 of FIG. 4.

In conjunction with the above described engine structure, it may be preferable to provide a positive means for effecting exhaust and intake of the device by providing rotating abutments or abutment blades which enter and retract from the cut-out portions 33, 34, 35 and 36 of the rotors during the operation of the engine. To this end one example of such an arrangement comprises an abutment shaft 55, FIG. 3, journaled on suitable bearings 56 and 57 in the housing 10 having a bevel gear 58 fixed thereon which is adapted to mesh with the bevel gear 59 fixed on the first rotor shaft 11. Fixed to the abutment shaft 55 adjacent the bearing 56 is the rotating abutment 60 having notched out portions 61 and 62 positioned between peripheral portions 63 and 64. The notched rotating abutment 60 driven by the bevel gears 58—59 rotates in timed relation with the second rotor 18 so as to alternately open and then close the piston passageway bore 54 at the appropriate end of the power stroke, the peripheral portions 63 and 64 effecting the closing of the passageway and thereby deflecting the exhaust gases out of the housing 10 through the passageway 75, leaving the cut-out portion 35 or 36 of rotor 18 with a partial vacuum which effects an intake stroke through passage 82.

Similarly, a second rotary abutment 65 is fixed on a second rotary abutment shaft 66 which is suitably journaled on bearings 67 and 68 carried in the housing 10. A bevel gear 69 is fixed on the shaft 66 which is in mesh with a mating bevel gear 70 fixed on the second rotor shaft 17. The rotating abutment 65 has notched out portions 71 and 72, FIG. 2, defining peripheral portions 73 and 74 thereof. The notched rotating abutment 65 driven by the bevel gears 69—70 rotates in timed relation with the first rotor 14 so as to alternately open and then close the piston passageway bore 53 at the appropriate end of the power stroke. Exhaust discharge ports 75 and 76 extend past one side face 77 and 78 of the respective rotating abutment discs 60 and 65. Exhaust port 75 communicates with bore 54 at the point 79 while exhaust port 76 communicates with bore 53 at the point 80. Intake ports 81 and 82 communicate with the bores 53 and 54 at the respective points 83 and 84.

Referring to FIG. 5 showing diagrammatically the arrangement of the essential elements of the device at the beginning of a power stroke for the first rotor of the engine, it will be noted that the housing bores on rotor passageways 53 and 54 in the housing 10 intersect at right angles forming the power and compression chambers in conjunction with the first and second rotors for the engine. Spark plugs 85 and 86 are provided in the combustion chamber walls 87 and 88 of the combustion chambers 87a and 88a.

As seen in FIG. 5, the spark plug 85 has just fired and the fuel-air mixture in the chamber 89 between the side of the peripheral portion 51 of the second rotor 18 and the trailing end of the peripheral portion 49 of the first rotor effect a power stroke rotating the peripheral portion 49 to the left as shown by the arrow 90. This causes peripheral portion 50 of the first rotor to compress the fuel-air mixture in the chamber 91 between the other side of the peripheral portion 51 of the second rotor 18 and the leading end of the peripheral portion 50 of the first rotor. The leading end of peripheral portion 49 at this time has almost completed the exhausting out through exhaust 76 in conjunction with the peripheral portion 74 of the second rotary abutment 65.

In FIG. 6 are shown the positions of the parts with the power stroke in chamber 89 and the exhaust stroke in chamber 92 partially completed. Peripheral portion 50 of the first rotor 14 has almost completed the compression stroke in chamber 91 ready for spark plug 86 to fire. Intake suction is then taking place with fuel-air mixture entering intake port 82 filling chamber 93 between the trailing end of peripheral portion 52 of the second rotor 18 and side of the peripheral portion 64 of the first rotating abutment 60. At this time exhaust port 76 is closed by peripheral portion 49 of rotor 14 while exhaust port 75 and intake port 82 are open.

FIG. 7 shows the situation just after spark plug 86 has fired igniting the charge in chamber 91 thus driving peripheral portion 51 in the direction indicated by the arrow 94 for the second rotor 18, causing its peripheral portion 52 to compress the charge, which came in through intake port 82, in chamber 95.

In FIG. 8 is shown a further stage in the operation of the engine in which the power stroke in chamber 91 is partially completed with exhaust port 75 closed off and with exhaust port 76 and intake port 81 open. The device then returns to the cycle shown in FIG. 5. Further detailed discussion of FIGS. 5, 6, 7 and 8 is not believed necessary since by inspection of these figures all stages in the operation of the rotary internal combustion engine may be readily understood.

Figure 9:
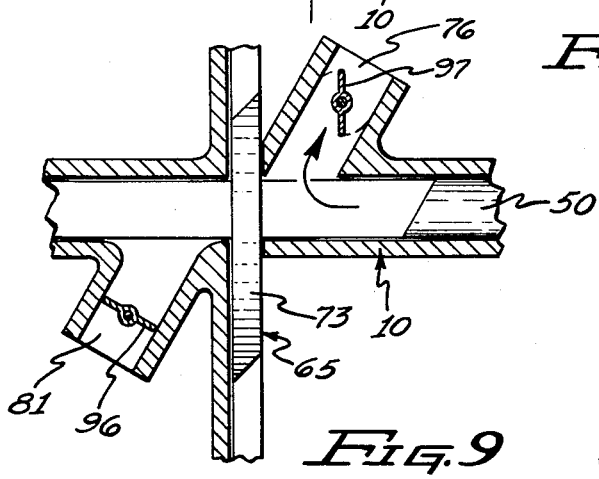
FIG. 9 is an enlarged fragmentary section showing a modification of control valves which may be provided in the intake and exhaust ports of the engine.
Figure 4:
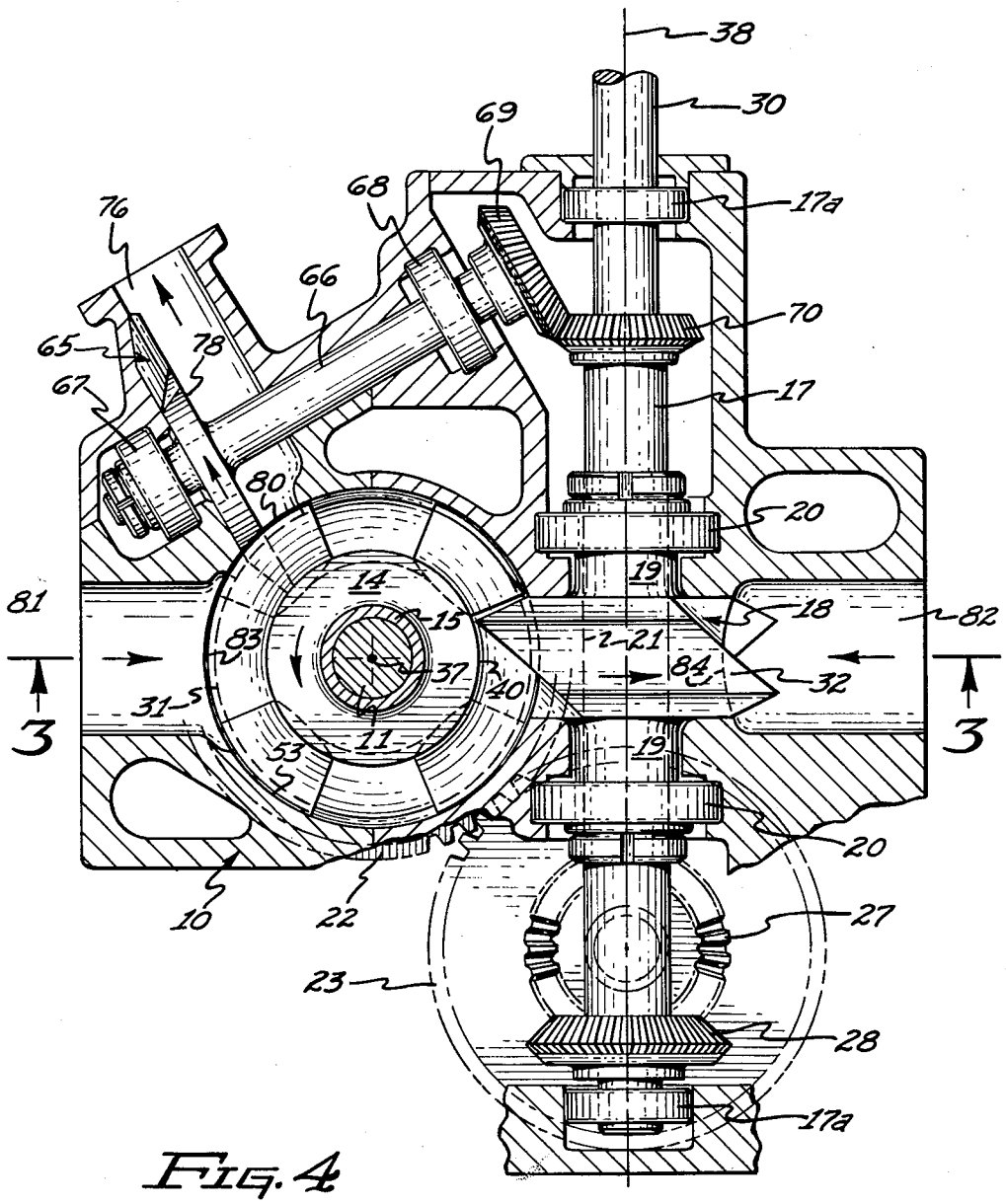
FIG. 4 is an enlarged section of the rotary internal combustion engine shown on the line 4—4 of FIG. 3.

In FIG. 9 is shown an arrangement wherein a control valve 96 may be provided in the intake ports 81 and 82 and/or a control valve 97 may be applied in the exhaust ports 75 and 76 of this engine. By this arrangement the fuel supply to the engine may be regulated and the braking action of the engine when coasting can be suitably controlled for all operating conditions.

It is to be understood that any number of peripheral portions 49—50 and 51—52 may be provided for the rotors to suit the required operating condition, the rotating abutments 60 and 65 being modified as required to meet the arrangement selected. The important feature of this engine is that each peripheral portion of each rotor during each revolution intakes and compresses the fuel-air mixture for a power and exhaust stroke in a passageway of a peripheral portion of the other rotor. For example, peripheral portion 50 of the first rotor compresses the fuel-air mixture for driving, when ignited by spark plug 86, the peripheral portion 51 of the second rotor 18, and with the same condition where peripheral portion 52 of the second rotor 18 compresses the fuel-air mixture which when ignited by spark plug 85 drives peripheral abutment 50 of the first rotor 14.

The engine as described is a positive displacement mechanism in that it may also be adapted to serve as a compression ignition engine, external combustion engine, pump or as a compressor by alteration of mechanical detail. Further, the device, including the rotors may be liquid or air cooled.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A rotary internal combustion engine comprising, a housing, rotor passageways in said housing, two synchronized rotors, each having at least one peripheral portion, a notched rotating abutment for each rotor and driven in timed relationship therefrom which is adapted to alternately open and then close said passageway in said housing at substantially the end of the power stroke of each peripheral portion of said rotor, a common intersection space of said rotor passageways in said housing occupied first by one peripheral portion of one rotor and then by a peripheral portion of another rotor, combustion chambers in said casing located adjacent to said common intersection space thereby communicating with each piston passageway, exhaust and intake ports in said casing communicating with each of said rotor passageways, and means for discharging burned gases through said exhaust ports and apply fuel mixture through said intake ports to said rotor passageway during operation of said engine.

2. An internal combustion engine having, a housing, two synchronized rotors enclosed in and rotatably fixed in said housing each having one or more peripheral pistons, each of which moves continuously in one direction in its own circular piston passageway, these circular piston passageways intersect and thereby form a common intersection space which is continuously occupied by a piston of one rotor or by a piston of the other rotor or by parts of pistons of each rotor, two notched rotary abutments enclosed in and rotatably fixed in said housing each of which is synchronized with one aforesaid rotor in such a manner as to alternately open and then close its circular piston passageway; said housing also provides an intake and exhaust passage to each circular piston passageway, two combustion chambers in said housing located diametrically opposite each other and adjacent to said common intersection space, each of said combustion chambers having a passage to each circular piston passageway so that each piston of each rotor during each revolution intakes and compresses a fuel mixture for a power and exhaust stroke in the passageway of a piston of the other rotor.

3. A rotary internal combustion engine, comprising a housing, a first rotor journaled in said housing, a second rotor journaled in said housing on an axis radially spaced from and angularly disposed relative to the axis of rotation of said first rotor, power transmission means in said housing interconnected between said rotors to cause said rotors to revolve in a predetermined timed relationship, a plurality of circumferentially spaced peripheral portions on each of said rotors separated by cut-out portions therebetween, housing bore rotor passageways formed in said housing intersecting at a common space of intersection of the peripheries of said rotors, and with combustion chambers in said casing adjacent to the intersection space and in communication with both rotor passageways and with intake and exhaust ports connected to each of said rotor passageways so that each peripheral portion of each rotor during each revolution thereof intakes and compresses the fuel mixture for a power and exhaust stroke in a rotor passageway of a peripheral portion on the other rotor, rotary abutments journaled in said housing, a power transmission means provided in said housing interconnected between said rotors and said rotary abutments to cause said rotors and rotary abutments to revolve in timed relationship, one rotary abutment coacting with said first rotor and its associated passageway and a second rotary abutment coacting with said second rotor and its associated passageway, said rotary abutments including disc portions having circumferentially spaced peripheral portions with notched-out portions therebetween, said disc portions revolving in planes angularly related to and across said rotor passageways in said housing so that each rotating abutment as the rotors and rotating abutments revolve alternately opens and then closes the rotor passageway with which the abutment coacts at substantially the end of each power stroke to effect the positive discharge of burned gases and promote the subsequent intake of a fresh fuel-air charge.

4. A rotary internal combustion engine, comprising a housing, a first rotor journaled in said housing, a second rotor journaled in said housing on an axis radially spaced from and angularly disposed relative to the axis of rotation of said first rotor, power transmission means in said housing interconnected between said rotors to cause said rotors to revolve in a predetermined timed relationship, a plurality of circumferentially spaced peripheral portions on each of said rotors separated by cut-out portions therebetween, housing bore rotor passageways formed in said housing intersecting at a common space of intersection of the peripheries of said rotors, and with combustion chambers in said casing adjacent to the intersection space and in communication with both rotor passageways and with intake and exhaust ports connected to each of said rotor passageways so that each peripheral portion of each rotor during each revolution thereof intakes and compresses the fuel mixture for a power and exhaust stroke in a rotor passageway of a peripheral portion on the other rotor, rotary abutments journaled in said housing, a power transmission means provided in said housing interconnected between said rotors and said rotary abutments to cause said rotors and rotary abutments to revolve in timed relationship, one rotary abutment coacting with said first rotor and its associated passageway and a second rotary abutment coacting with said second rotor and its associated passageway, said rotary abutments including disc portions having circumferentially spaced peripheral portions with notched-out portions therebetween, said disc portions revolving in planes angularly related to and across said rotor passageways in said housing so that each rotating abutment as the rotors and rotating abutments revolve alternately opens and then closes the rotor passageway with which the abutment coacts at substantially the end of each power stroke to effect the positive discharge of burned gases and promote the subsequent intake of a fresh fuel-air charge, wherein the rotating abutment disc is located between the exhaust and intake ports of each rotor passageway.

5. An internal combustion engine having, a casing, a first rotor in said casing with at least one peripheral piston, said casing and rotor forming a first circular passageway for said piston, a second rotor in said casing with at least one peripheral piston, said casing and said second rotor forming a second circular passageway for said latter piston, said first and second circular passageways intersecting and thereby forming a common intersection space, said casing providing an inlet and exhaust passage to each circular piston passageway, two combustion chambers in said casing located diametrically opposite each other and adjacent to a common intersection space, each combustion chamber having a passage to each circular piston passageway, means interconnecting said rotors for synchronous operation to cause said pistons of said first and second rotors respectively to pass through said intersection space alternately, whereby a piston of said first rotor occupies said intersection space to block said second circular passageway for cooperation with at least one piston of said second rotor for compression and power strokes on opposite sides respectively of said blocking piston, and whereby alternately a piston of said second rotor occupies said intersection space to block said first circular passageway for cooperation with at least one piston of said first rotor for compression and power strokes on opposite sides respectively of blocking piston, rotary abutments journaled in said casing, a power transmission means provided in said casing interconnected between said rotors and rotary abutments to cause said rotors and rotary abutments to revolve in timed relationship, one rotary abutment coacting with said first rotor and its associated passageway and a second rotary abutment coacting with said second rotor and its associated passageway, said rotary abutments having circumferentially spaced portions with notched-out portions therebetween, said disc portions revolving in planes angularly related to and across said rotor passageways in said casing so that each rotating abutment, as the rotors and rotating abutments revolve, alternately opens then closes the rotary passageway with which the abutment coacts at substantially the end of each power stroke to effect the positive discharge of burned gases and to promote the subsequent intake of a fresh fuel mixture.

6. A rotary internal combustion engine, comprising a housing, a first rotor journaled in said housing, a second rotor journaled in said housing on an axis radially spaced from and angularly disposed relative to the axis of rotation of said first rotor, power transmission means in said housing interconnected between said rotors to cause said rotors to revolve in a predetermined timed relationship, a plurality of circumferentially spaced peripheral portions on each of said rotors separated by cut-out portions therebetween, housing bore rotor passageways formed in said housing intersecting at a common point of intersection of the peripheries of said rotors, and intake and exhaust ports connected to each of said rotor passageways so that each peripheral portion of each rotor during each revolution thereof intakes and compresses the fuel mixture for a power and exhaust stroke in a rotor passageway of a peripheral portion on the other rotor, rotary abutments journaled on said housing, a power transmission means is provided in said housing interconnected between said rotors and said rotary abutments to cause said rotors and rotary abutments to revolve in timed relationship, one rotary abutment coacting with said first rotor and its associated passageway and a second rotary abutment coacting with said second rotor and its associated passageway, said rotary abutments including disc portions having circumferentially spaced peripheral portions with notched-out portions therebetween, said disc portions revolving in planes angularly related to and across said rotor passageways in said housing so that each rotating abutment as the rotors and rotating abutments revolve alternately opens and then closes the rotor passageway with which the abutment coacts at substantially the end of each power stroke.

7. A rotary internal combustion engine, comprising a housing, a first rotor journaled in said housing, a second rotor journaled in said housing on an axis radially spaced from and angularly disposed relative to the axis of rotation of said first rotor, power transmission means in said housing interconnected between said rotors to cause said rotors to revolve in a predetermined timed relationship, a plurality of circumferentially spaced peripheral portions on each of said rotors separated by cut-out portions therebetween, housing bore rotor passageways formed in said housing intersecting at a common point of intersection of the peripheries of said rotors, and intake and exhaust ports connected to each of said rotor passageways so that each peripheral portion of each rotor during each revolution thereof intakes and compresses the fuel mixture for a power and exhaust stroke in a rotor passageway of a peripheral portion on the other rotor, rotary abutments journaled on said housing, a power transmission means is provided in said housing interconnected between said rotors and said rotary abutments to cause said rotors and rotary abutments to revolve in timed relationship, one rotary abutment coacting with said first rotor and its associated passageway and a second rotary abutment coacting with said second rotor and its associated passageway, said rotary abutments including disc portions having circumferentially spaced peripheral portions with notched-out portions therebetween, said disc portions revolving in planes angularly related to and across said rotor passageways in said housing so that each rotating abutment as the rotors and rotating abutments revolve alternately opens and then closes the rotor passageway with which the abutment coacts at substantially the end of each power stroke, each rotating abutment disc being located between the intake and exhaust ports of the rotor passageway with which it coacts.

References Cited in the file of this patent
UNITED STATES PATENTS

| 1,220,688 | Sanders | Mar. 27, 1917 |

FOREIGN PATENTS

| 3,431 | Great Britain | 1909 |
| 1,200,933 | France | July 6, 1959 |